US012220820B2

(12) United States Patent
Hida

(10) Patent No.: US 12,220,820 B2
(45) Date of Patent: Feb. 11, 2025

(54) ROBOT SLIDER POSITION SETTING DEVICE, ROBOT SLIDER POSITION SETTING METHOD, AND ROBOT SLIDER POSITION SETTING PROGRAM

(71) Applicant: Kobe Steel, Ltd., Kobe (JP)

(72) Inventor: Masatoshi Hida, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 361 days.

(21) Appl. No.: 17/656,304

(22) Filed: Mar. 24, 2022

(65) Prior Publication Data

US 2022/0355478 A1  Nov. 10, 2022

(30) Foreign Application Priority Data

May 6, 2021 (JP) .................. 2021-078630

(51) Int. Cl.
*B25J 9/16* (2006.01)
*B25J 17/02* (2006.01)

(52) U.S. Cl.
CPC ............. *B25J 9/1664* (2013.01); *B25J 17/02* (2013.01)

(58) Field of Classification Search
CPC . B25J 9/1664; B25J 17/02; B25J 9/162; B25J 9/1666
See application file for complete search history.

(56) References Cited

U.S. PATENT DOCUMENTS

| 2007/0106421 A1* | 5/2007 | Kamrani | B25J 9/1661 |
| | | | 700/245 |
| 2011/0213497 A1* | 9/2011 | Nair | B25J 9/1666 |
| | | | 700/255 |
| 2017/0189126 A1* | 7/2017 | Weir | A61B 34/25 |
| 2018/0101166 A1* | 4/2018 | Aldridge | B25J 9/1671 |
| 2018/0161978 A1* | 6/2018 | Naitou | B25J 5/00 |

(Continued)

FOREIGN PATENT DOCUMENTS

| JP | 10-244481 A | 9/1998 |
| JP | 4103057 B2 | 6/2008 |
| JP | 2010-046753 A | 3/2010 |

(Continued)

*Primary Examiner* — Khoi H Tran
*Assistant Examiner* — Tristan J Greiner
(74) *Attorney, Agent, or Firm* — Oblon, McClelland, Maier & Neustadt, L.L.P.

(57) ABSTRACT

A robot slider position setting device sets a position of a robot slider that moves while being loaded with a robot that performs predetermined work on a workpiece by using a tool provided at a distal end of the robot. The robot slider position setting device includes an interference-region-information storage unit that stores interference region information indicating an interference region with which the robot interferes in a predetermined ambient environment, an approaching-direction determination unit that determines a direction of an arm of the robot as an arm approaching direction such that the direction does not overlap the interference region by fixing a wrist rotation center of the robot in a state where the tool is in an orientation according to a predetermined working position, and a position determination unit that determines the position of the robot slider based on the arm approaching direction determined by the approaching-direction determination unit.

10 Claims, 7 Drawing Sheets

(56) References Cited

U.S. PATENT DOCUMENTS

2019/0047073 A1\* 2/2019 Shika ................... B25J 17/0258
2019/0391597 A1\* 12/2019 Dupuis ................. B25J 9/0084

FOREIGN PATENT DOCUMENTS

| JP | 2018-20423 A | | 2/2018 |
|----|--------------|---|--------|
| JP | 2018020423 A | \* | 2/2018 |
| JP | 2018-94641 A | | 6/2018 |

\* cited by examiner

FIG. 4
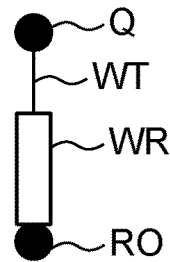
FIG. 5
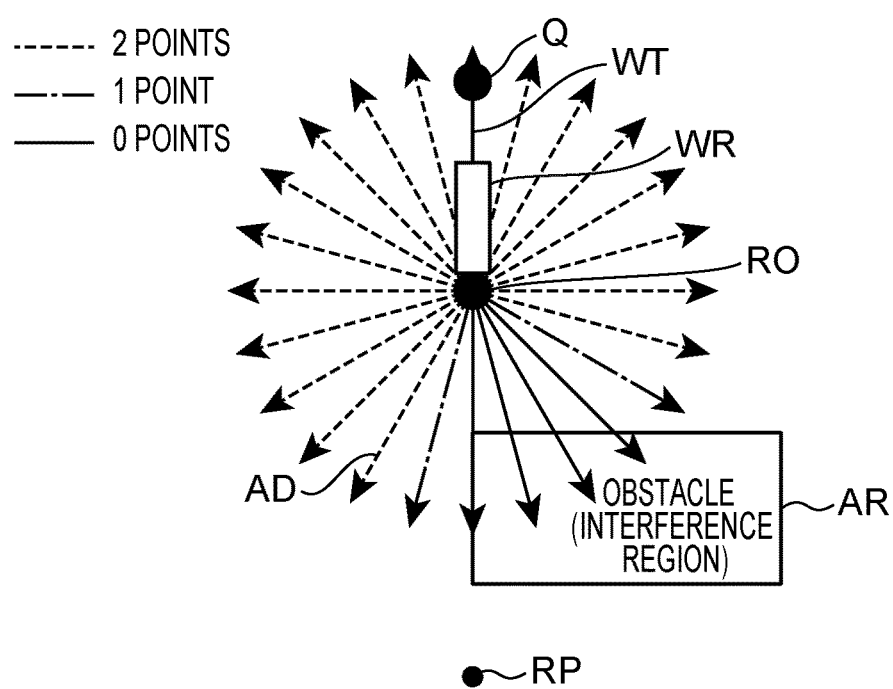

ROBOT SLIDER POSITION SETTING DEVICE, ROBOT SLIDER POSITION SETTING METHOD, AND ROBOT SLIDER POSITION SETTING PROGRAM

BACKGROUND OF THE INVENTION

1. Field of the Invention

The present invention relates to a robot slider position setting device, a robot slider position setting method, and a robot slider position setting program for setting the position of a robot slider that moves while being loaded with a robot that performs predetermined work on a workpiece.

2. Description of the Related Art

With the development of robots that perform predetermined work on workpieces, such robots are being widely used in various industrial fields. In order for a robot, to cover a wider range than the operating range of an arm thereof, the robot is sometimes installed on a slider for positionally moving the robot. Although a robot operates in accordance with operation data (operation program, teaching data, or teaching program) about a movement preliminarily taught in accordance with the operational purpose, if the robot is to be installed on a slider, it is necessary to set the movement of the slider and include the movement in the operation data. For example, Japanese Unexamined Patent Application Publication No. 2010-46753 discloses a technique related to such operation data including the movement of the slider.

An offline-teaching-data creating method disclosed in Japanese Unexamined Patent Application Publication No. 2010-46753 involves creating offline teaching data of a robot system that continuously performs work on a workpiece while operating a slider that moves an installation base of a robot. The method includes an initialization step for setting a working position on the workpiece, an evaluation-value calculating step for setting a search plane extending through a robot origin point serving as an operating point of the robot, setting a position of the slider such that each of a plurality of grid points set within the search plane matches the working position on the workpiece, and calculating an evaluation value for each grid point at the position of the slider, and a setting step for setting the position of the slider based on the evaluation value and using the set position of the slider as the offline teaching data of the robot.

SUMMARY OF THE INVENTION

In order to prevent the slider and the robot from interfering (i.e., coming into contact) with another object while the slider is moving, it is necessary to set the movement of the slider. In Japanese Unexamined Patent Application Publication No. 2010-46753, the evaluation value is determined by using an evaluation function including, for example, the degree of interference or near-miss interference in the orientation of the welding robot and information indicating whether or not the slider is within an operating range (e.g., see paragraph [0025]). However, even when all the grid points in the search plane are set as welding points, if an appropriate position of the slider cannot be set due to an inability to perform an inverse transform or a low evaluation value, the process for setting the position of the slider is to be performed again from the beginning by changing the search plane (e.g., see paragraph [0028] and paragraph [0033]). Thus, there is room for improvement in Japanese Unexamined Patent Application Publication No. 2010-46753 in terms of the efficiency in the process (i.e., information processing) for setting the position of the slider.

The present invention has been made in view of the circumstances described above, and an object thereof is to provide a robot slider position setting device, a robot slider position setting method, and a robot slider position setting program that can efficiently set the position of a robot slider.

As a result of various studies, the present inventor has discovered that the aforementioned object can be achieved in accordance with the present invention below. Specifically, a robot slider position setting device according to an aspect of the present invention sets a position of a robot slider that moves while being loaded with a robot that performs predetermined work on a workpiece by using a tool provided at a distal end of the robot. The robot slider position setting device includes an interference-region-information storage unit that stores interference region information indicating an interference region with which the robot interferes in a predetermined ambient environment, an approaching-direction determination unit that determines a direction of an arm of the robot as an arm approaching direction such that the direction does not overlap the interference region by fixing a wrist rotation center of the robot in a state where the tool is in an orientation according to a predetermined working position, and a position determination unit that determines the position of the robot slider based on the arm approaching direction determined by the approaching-direction determination unit.

The robot slider position setting device determines the direction of the arm of the robot such that the direction does not overlap the interference region before determining the position of the robot slider, so that a case where the process for determining the position of the robot slider again from the beginning can be eliminated, whereby the position of the robot slider can be set efficiently.

In the robot slider position setting device according to the above aspect, the approaching-direction determination unit may determine the arm approaching direction by performing a search in a circumferential direction of a circle centered on the wrist rotation center within a plane including the wrist rotation center. Preferably, in the robot slider position setting device described above, the approaching-direction determination unit may determine the arm approaching direction such that the direction of the arm of the robot does not overlap the interference region and is located closest to a predetermined reference position. Preferably, the reference position may be a front position of the workpiece.

The robot slider position setting device performs the search in the circumferential direction of the circle centered on the wrist rotation center within the plane including the wrist rotation center, thereby enabling the search for the arm approaching direction with a relatively simple process.

In the robot slider position setting device according to the above aspect, the working position may include a plurality of working positions arranged in a processing order, the approaching-direction determination unit may determine the arm approaching direction with respect to each of the working positions in the processing order, the position determination unit may determine the position of the robot slider with respect to each of a plurality of the arm approaching directions determined by the approaching-direction determination unit, and the approaching-direction determination unit may determine a current arm approaching direction such that the current arm approaching direction is closest to a previous arm approaching direction in the processing order.

The robot slider position setting device determines the current arm approaching direction such that the direction is located closest to the previous arm approaching direction in the processing order, so that the position of the robot slider can be determined such that the robot can be moved smoothly with respect to each of the working positions arranged in the processing order.

In the robot slider position setting device according to the above aspect, the position determination unit may set a search plane that includes the arm approaching direction determined by the approaching-direction determination unit and in which a robot origin point serving as an operating point of the robot is located in the arm approaching direction, set the position of the robot slider such that the robot origin point matches each of a plurality of grid points set within the search plane, calculate an evaluation value for each grid point at the position of the robot slider, and determine the position of the robot slider based on the evaluation value. Preferably, in the robot slider position setting device, the position determination unit may further use the position of the robot slider as offline teaching data. Preferably, in the robot slider position setting device, the evaluation value may be determined by using an evaluation function including any one of a margin from a singular orientation of the robot, a margin from an operating range boundary of each axis, the degree of interference or near-miss interference in the orientation of the robot, a margin from an operating range boundary of each axis of the robot slider, and a movement amount from the previous position. Preferably, in the robot slider position setting device, the robot may include a first link having a first joint, a second link connected to the first link via a second joint, a third link having fourth and fifth joints and connected to the second link via a third joint, and an end effector connected to the third link via a sixth joint. The tool may be provided at the end effector. The position determination unit, may set, the position of the robot slider such that the robot origin point matches each of the points set in the circumferential direction of a circle centered on the position of the third joint within the search plane including the arm approaching direction determined by the approaching-direction determination unit, calculate an evaluation value for each point at the position of the robot slider, and determine the position of the robot slider based on the evaluation value.

Such a robot slider position setting device can automatically and efficiently determine an appropriate position of the robot slider.

A robot slider position setting method according to an aspect of the present invention is for setting a position of a robot slider that moves while being loaded with a robot that performs predetermined work on a workpiece by using a tool provided at a distal end of the robot. The robot slider position setting method includes an interference-region setting step for setting an interference region with which the robot interferes in a predetermined ambient environment, an approaching-direction determination step for determining a direction of an arm of the robot as an arm approaching direction such that the direction does not overlap the interference region by fixing a wrist rotation center of the robot in a state where the tool is in an orientation according to a predetermined working position, and a position determination step for determining the position of the robot slider based on the arm approaching direction determined in the approaching-direction determination step.

A robot slider position setting program according to an aspect of the present invention is for setting a position of a robot slider that moves while being loaded with a robot that performs predetermined work on a workpiece by using a tool provided at a distal end of the robot. The robot slider position setting program causes a computer to function as an interference-region-information storage unit that stores interference region information indicating an interference region with which the robot interferes in a predetermined ambient environment, an approaching-direction determination unit that determines a direction of an arm of the robot as an arm approaching direction such that the direction does not overlap the interference region by fixing a wrist rotation center of the robot in a state where the tool is in an orientation according to a predetermined working position, and a position determination unit that determines the position of the robot slider based on the arm approaching direction determined by the approaching-direction determination unit.

The robot slider position setting method and the robot slider position setting program determine the direction of the arm of the robot such that the direction does not overlap the interference region before determining the position of the robot slider, so that a case where the process for determining the position of the robot slider again from the beginning can be eliminated, whereby the position of the robot slider can be set efficiently.

The robot slider position setting device, the robot slider position setting method, and the robot slider position setting program according to the present invention can efficiently set the position of the slider.

BRIEF DESCRIPTION OF THE DRAWINGS

FIG. 4 is a diagram for explaining a process for setting the position and orientation of a welding torch as an example of a tool;

FIG. 5 is a diagram for explaining a process for searching for arm approachable directions;

DESCRIPTION OF THE PREFERRED EMBODIMENTS

Figure 1:
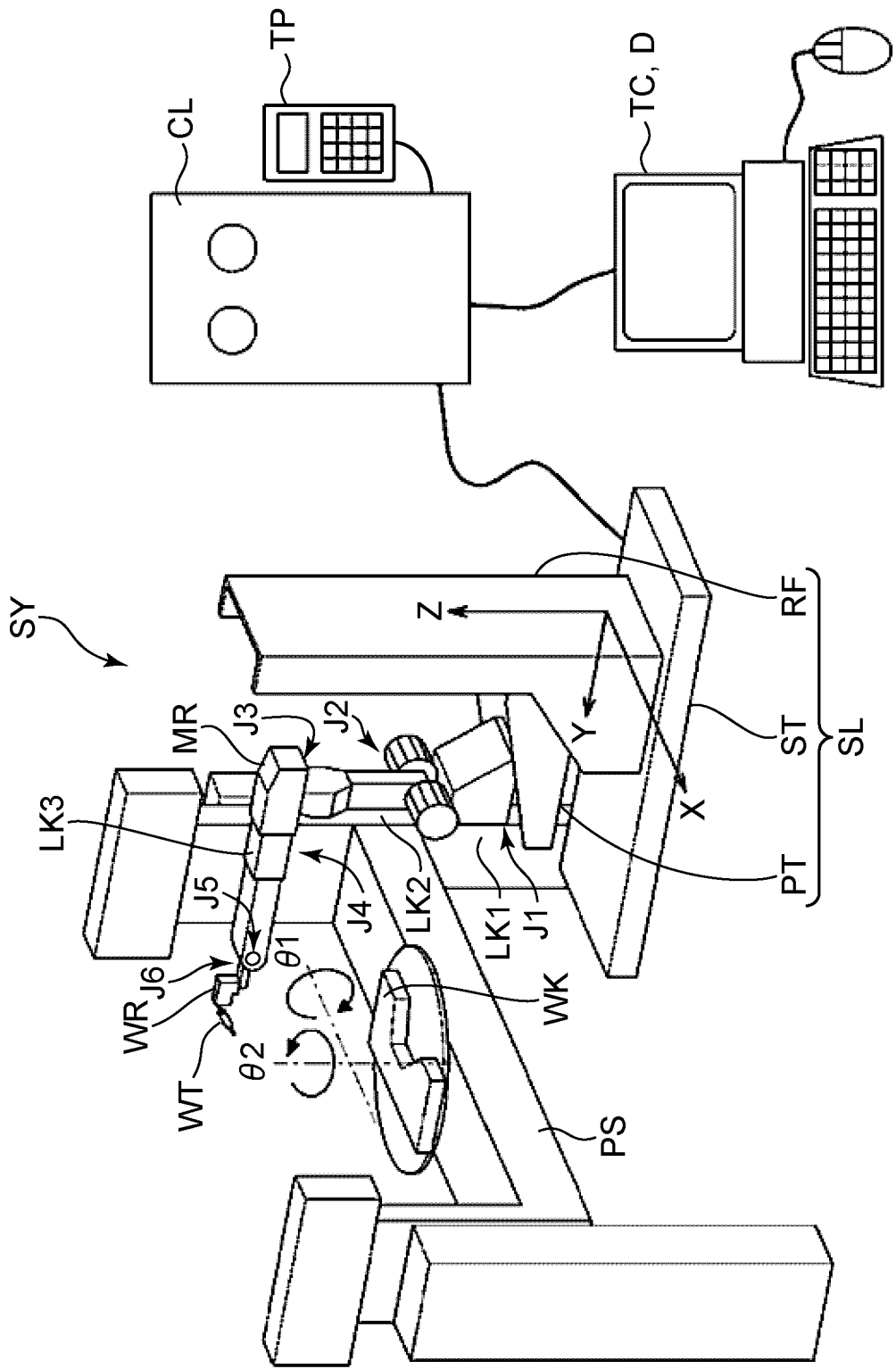
FIG. 1 schematically illustrates the configuration of a welding system equipped with a robot slider position setting device according to an embodiment.

One or more embodiments of the present invention will be described below with reference to the drawings. However, the scope of the invention is not limited to the disclosed one or more embodiments. Components given the same reference signs in the drawings indicate that they are the same components, and descriptions thereof will be omitted, where appropriate. In this description, when collectively referring to objects, such objects will be indicated by using reference signs without subscripts, whereas when individually referring to objects, such objects will be indicated by using reference signs with subscripts.

A robot slider position setting device according to an embodiment is a device for setting a position of a robot slider (simply referred to as "slider" hereinafter, where appropriate) that moves while being loaded with a robot that performs predetermined work on a workpiece by using a tool provided at a distal end of the robot. The robot slider position setting device (simply referred to as "position setting device" hereinafter, where appropriate) includes an interference-region-information storage unit that stores interference region information indicating an interference region with which the robot interferes in a predetermined ambient environment, an approaching-direction determination unit that determines a direction of an arm of the robot as an arm approaching direction such that the direction does not overlap the interference region by fixing a wrist rotation center of the robot in a state where the tool is in an orientation according to a predetermined working position, and a position determination unit that determines the position of the robot slider based on the arm approaching direction determined by the approaching-direction determination unit. The robot slider position setting device, as well as a robot slider position setting method and a robot slider position setting program that are implemented in the robot slider position setting device, will be described in further detail below with reference to an example where they are applied to a welding system. The robot slider position setting device, method, and program are not limited to a case where they are applied to a welding system, and may be applied to any system that uses a robot slider that travels while being loaded with a robot.

Figure 2:
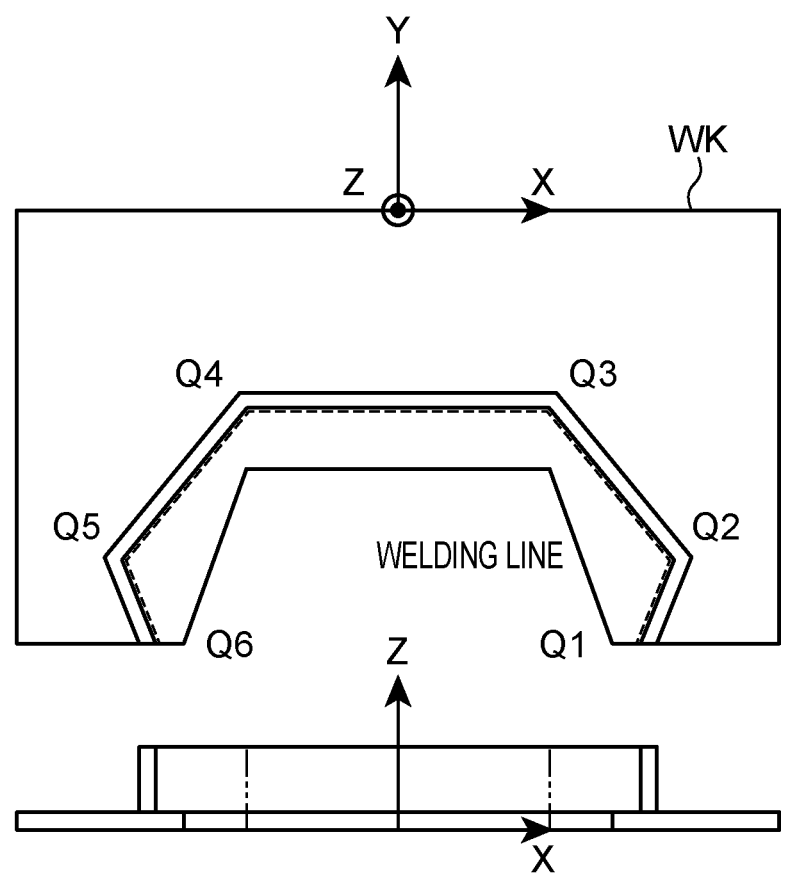
FIG. 2 illustrates an example of a workpiece.
Figure 3:
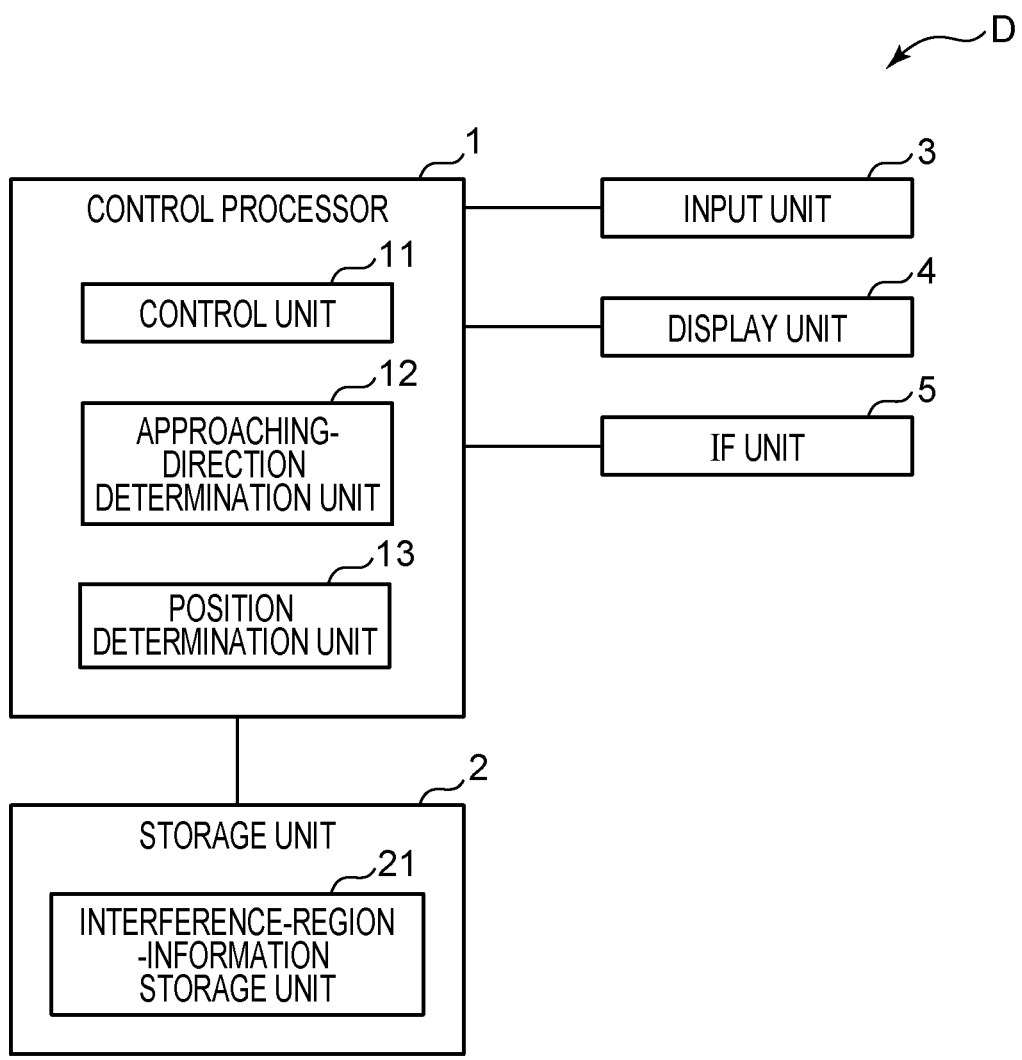
FIG. 3 is a block diagram illustrating the configuration of the robot slider position setting device.
Figure 6A:
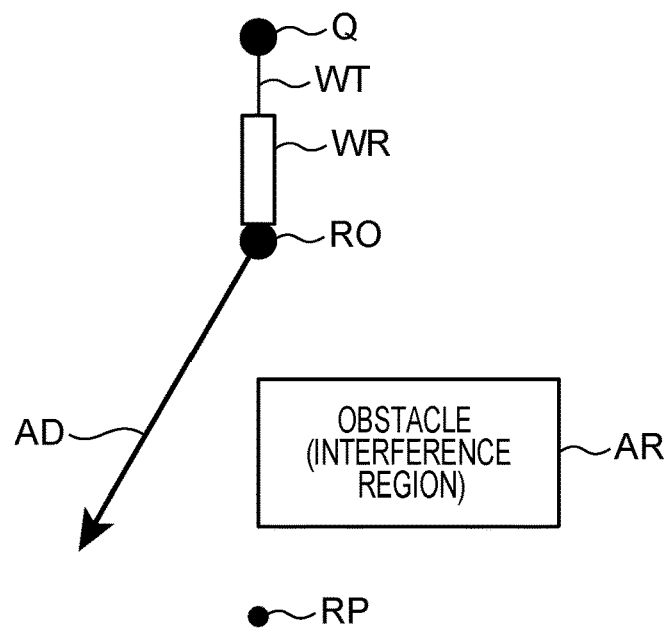
FIGS. 6A and 6B are diagrams for explaining a process for setting an arm approaching direction.
Figure 6B:
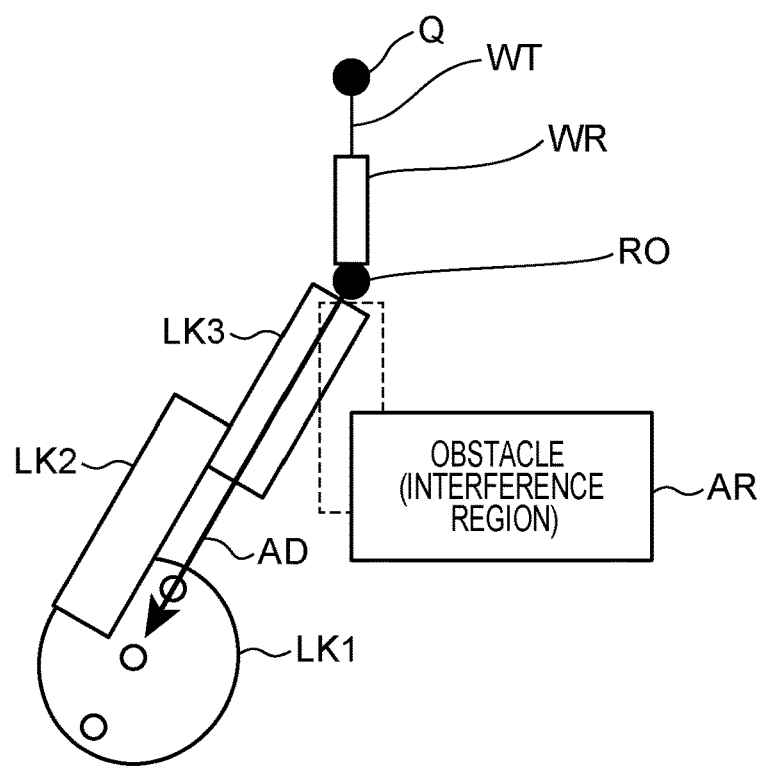
Figure 7:
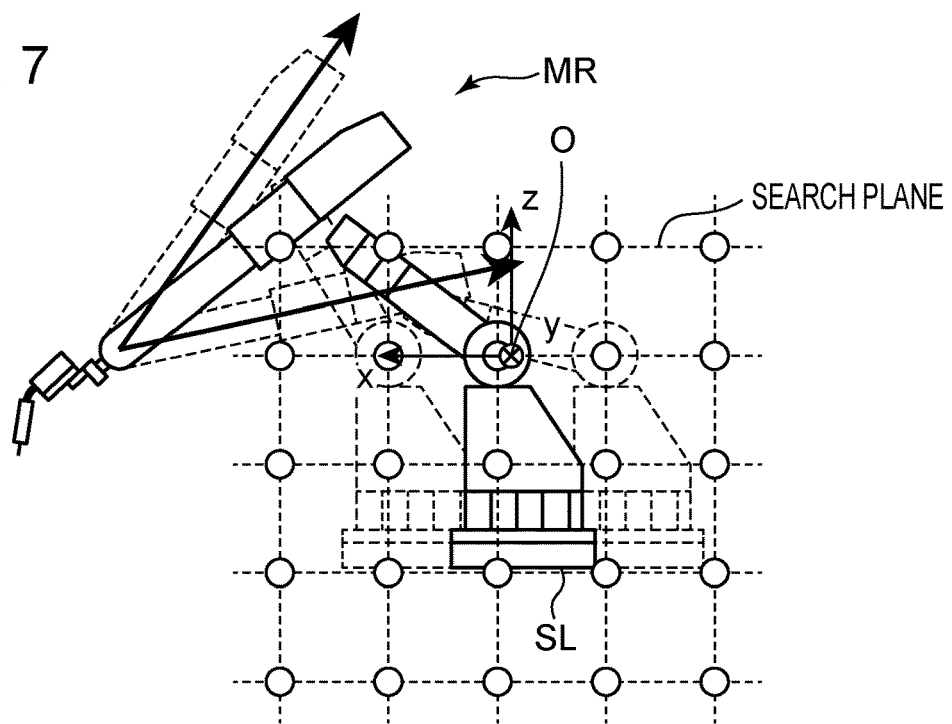
FIG. 7 is a diagram for explaining a search plane and grid points in the search plane.

FIG. 1 schematically illustrates the configuration of a welding system equipped with the robot slider position setting device according to the embodiment. FIG. 2 illustrates an example of a workpiece. FIG. 3 is a block diagram illustrating the configuration of the robot slider position setting device. FIG. 4 is a diagram for explaining a process for setting the position and orientation of a welding torch as an example of a tool. FIG. 5 is a diagram for explaining a process for searching for arm approachable directions. FIGS. 6A and 6B are diagrams for explaining a process for setting an arm approaching direction. Specifically, FIG. 6A illustrates the arm approaching direction by using a directed line segment, and FIG. 6B illustrates a state where a virtual robot model is disposed (i.e., image-rendered) such that an arm extends parallel to the arm approaching direction shown in FIG. 6A. FIG. 7 is a diagram for explaining a search plane and grid points in the search plane. FIGS. 4 to 6B are top views of a robot, MR, whereas FIG. 7 is a side view of the robot, MR.

As shown in FIG. 1, for example, a welding system SY equipped with the robot slider position setting device according to the embodiment includes the robot MR, a slider SL, a positioner PS, a controller CL, a teaching pendant TP, and an offline teaching device TC.

The slider SL is a device that moves while being loaded with the robot MR that performs predetermined work on a workpiece WK by using a tool provided at the distal end of the robot MR. The slider SL is connected to the controller CL and operates by being controlled by the controller CL. The tool used is an appropriate tool suitable for the predetermined work. In this embodiment, the welding system SY performs arc welding as the predetermined work, and a welding torch WT serves as an example of the tool accordingly. As shown in FIG. 1, the slider SL is movable along three axes, namely, an X axis extending in the front-rear direction relative to the workpiece WK, a Y axis extending in the left-right direction, and a Z axis extending in the up-down direction. The X axis, the Y axis and the Z axis are orthogonal to one another and constitute an XYZ Cartesian coordinate system (world coordinate system). Although the XYZ Cartesian coordinate system is illustrated over the slider SL to indicate the movable directions of the slider SL in FIG. 1, for example, as shown in FIG. 2, an origin point of the XYZ Cartesian coordinate system is set to match a workpiece origin point set at a predetermined position of the workpiece WK.

More specifically, in the example shown in FIG. 1, the slider SL includes a cart ST, a lifting-lowering unit RF, and a pedestal PT. The cart ST is movable in the X-axis direction and the Y-axis direction. The lifting-lowering unit RF is mounted on the cart ST, lifts and lowers the pedestal PT in the Z-axis direction, is cross-sectionally C-shaped, and extends in the Z-axis direction. The pedestal PT is plate-shaped and has the robot MR installed thereon.

The robot MR is connected to the controller CL, operates by being controlled by the controller CL, and includes an arm AM having a plurality of joints. For example, the robot MR is a multi-joint robot, such as a vertical six-axis robot with six degrees of freedom by having six joints, namely, first to sixth joints J1 to J6. For example, in the example shown in FIG. 1, the robot MR includes a first link LK1 having the first joint J1, a second link LK2 connected to the first link LK1 via the second joint J2, a third link LK3 having the fourth and fifth joints J4 and J5 and connected to the second link LK2 via the third joint J3, and an end effector WR connected to the third link LK3 via the sixth joint J6. The arm of the robot MR includes the first to third links LK1 to LK3 and the first, to sixth joints J1 to J6. In this embodiment, the end effector WR at, the distal end is provided with the welding torch WT as an example of a tool, so that the robot MR can weld the workpiece WK by arc welding using a welding wire fed from the welding torch WT.

The positioner PS is a device that holds the workpiece WK in a rotatable manner by θ1 and θ2 about two axes, namely, the Y axis and the Z axis. The positioner PS is connected to the controller CL and operates by being controlled by the controller CL.

The teaching pendant TP is a handheld operation device connected to the controller CL and provided for manually operating the slider SL and the robot MR. Teaching the slider SL and the robot MR about movements by using the teaching pendant TP involves causing the slider SL and the robot MR to actually move in accordance with a manual operation, thereby teaching the slider SL and the robot MR about, for example, the movement path and the position of the slider SL and the movement path and the position of the welding torch WT relative to the workpiece WK.

The offline teaching device TC reproduces the slider SL and the robot MR as a slider model and a virtual robot model in a virtual space of a computer and causes the slider model and the virtual robot model to simulate the movements of the slider SL and the robot MR, so as to create operation data (operation program or teaching program) for causing the slider SL and the robot MR to move in accordance with the operational purpose. For example, the workpiece WK shown in FIG. 2 has six welding points Q1 to Q6 (as an example of a plurality of working positions arranged in a processing order) and five continuous welding lines that sequentially connect the welding points Q1 to Q6, and operation data used for performing welding at the welding points Q1 to Q6 and along the welding lines is created. By setting the position of the robot MR, the position of the slider SL is also set. Therefore, the slider model may be omitted. The operation data created by the offline teaching device TC is, for example, recorded (or stored) in a recording medium (or a storage medium) that records (or stores) data, is read by the controller CL from this recording medium, and is stored in the controller CL. The recording medium (or the storage medium) is, for example, a flexible disk, a CD-R (compact disc recordable), a DVD-R (digital versatile disc recordable), a USB (universal serial bus) memory, or an SD card (registered trademark). Alternatively, the offline teaching device TC and the controller CL may be connected in a communicable manner so that the operation data may be transmitted from the offline teaching device TC to the controller CL by data communication and be stored in the controller CL.

A robot slider position setting device D according to an embodiment is provided in, for example, the offline teaching device TC in this embodiment.

The controller CL controls the slider SL and the robot MR in accordance with the operation data (operation program or teaching program) created by the teaching pendant TP or the offline teaching device TC preliminarily teaching the slider SL and the robot MR, and causes the welding torch WT to weld the workpiece WK.

For example, as shown in FIG. 3, the robot slider position setting device D according to the embodiment provided in the offline teaching device TC includes a control processor 1, a storage unit 2, an input unit 3, a display unit 4, and an interface (IF) unit 5.

The input unit 3 is connected to the control processor 1 and is used for inputting various types of commands, such as a command for starting a teaching operation, and various types of data to the position setting device D (offline teaching device TC). The various types of data are required for causing the position setting device D (offline teaching device TC) to operate and include the name of operation data and interference region information. The input unit 3 includes, for example, a plurality of input switches to which predetermined functions are allocated, a keyboard, and a mouse. The display unit 4 is connected to the control processor 1 and displays, for example, a command or data input from the input unit 3, as well as the slider model and the virtual robot model in the virtual space generated by the offline teaching device TC (position setting device D), by being controlled by the control processor 1. Examples of the display unit 4 include a cathode-ray-tube (CRT) display, a liquid crystal display (LCD), and an organic electroluminescence (EL) display.

The input unit 3 and the display unit 4 may be constituted of a touchscreen. If a touchscreen is used, the input unit 3 is, for example, a position input device that detects an operated position based on a resistive film method or a capacitance method to receive the operated position. In this touchscreen, the position input device is provided on the display surface of the display unit 4, and the display unit 4 displays one or more inputtable content candidates. When a user touches the display position displaying the inputtable content that the user desires to input, the position input device detects the position, and the display content displayed at the detected position is input as the user's operational input content to the position setting device D (offline teaching device TC). With such a touchscreen, the user can intuitively and easily comprehend the input operation, so that a user-friendly position setting device D (offline teaching device TC) can be provided.

The IF unit 5 is a circuit connected to the control processor 1 and, for example, receives and outputs data from and to an external device by being controlled by the control processor 1. Examples of the IF unit 5 include an RS-232C interface circuit using serial communication, an interface circuit using the Bluetooth (registered trademark) standard, and an interface circuit using the USB standard. Alternatively, the IF unit 5 may be a data communication card or a communication interface circuit that exchanges a communication signal with an external device. An example of the communication interface circuit is a communication interface circuit that complies with the IEEE 802.11 standard.

The storage unit 2 is a circuit that is connected to the control processor 1 and that stores various types of predetermined programs and various types of predetermined data by being controlled by the control processor 1. The various types of predetermined programs each include, for example, a control processing program. Examples of the control processing program include a control program for controlling the units 2 to 5 of the position setting device D (offline teaching device TC), an approaching-direction determination program for determining the direction of the arm of the robot MR as an arm approaching direction such that the direction does not overlap an interference region by fixing the wrist rotation center of the robot MR in a state where the tool (i.e., the welding torch WT as an example in this embodiment) is in an orientation according to a predetermined working position, and a position determination program for determining the position of the slider SL based on the arm approaching direction determined in the approaching-direction determination program. The various types of predetermined data each include, for example, data required for executing these programs. An example of such data is the aforementioned interference region information. The storage unit 2 includes, for example, a ROM (read-only memory) as a nonvolatile storage element or an EEPROM (electrically erasable programmable read-only memory) as a rewritable nonvolatile storage element. The storage unit 2 also includes, for example, a RAM (random access memory) that serves as a so-called working memory of the control processor 1 and that stores data created during execution of the aforementioned predetermined programs. Moreover, the storage unit 2 may include a hard disk device having a relatively large storage capacity.

The storage unit 2 functionally includes an interference-region-information storage unit 21 that stores the aforementioned interference region information. The interference region information indicates an interference region with which the robot MR interferes in a predetermined ambient environment. Examples of the interference region information include the coordinates of inflection points on a contour line of the interference region in a case where the interference region is polyhedral, and the coordinates of the center point, of a sphere and the radius thereof in a case where the interference region is spherical. More specifically, the interference region is a three-dimensional environment model disposed in the ambient environment of the robot MR and mimicking an obstacle. Examples of the obstacle include a device, such as a control panel, and an accessory, such as a pedestal. The interference region information indicates the three-dimensional environment model. The interference region information may contain information indicating a second interference region with which the slider SL interferes in a predetermined ambient environment.

The control processor 1 is a circuit that controls the units 2 to 5 of the position setting device D (offline teaching device TC) in accordance with the functions of the individual units, reproduces the slider SL and the robot MR as a virtual slider model and a virtual robot model in a virtual space, causes the slider model and the virtual robot model to simulate the movements of the slider SL and the robot MR so as to create operation data (operation program or teaching program) for causing the slider SL and the robot MR to move in accordance with the operational purpose, and determines the position of the slider SL. The control processor 1 includes, for example, a CPU (central processing unit) and a peripheral circuit thereof. With execution of the control processing program, the control processor 1 functionally includes a control unit 11, an approaching-direction determination unit 12, and a position determination unit 13.

The control unit 11 controls the units 2 to 5 of the position setting device D (offline teaching device TC) in accordance with the functions of the individual units, and is responsible for overall control of the position setting device D (offline teaching device TC).

The approaching-direction determination unit 12 determines the direction of the arm of the robot MR as an arm approaching direction such that the direction does not overlap the interference region by fixing the wrist rotation center of the robot MR in a state where the tool (i.e., the welding torch WT as an example in this embodiment) is in an orientation according to a predetermined working position. The wrist rotation center is a single point where a fourth rotation axis of the fourth joint J4, a fifth rotation axis of the fifth joint J5, and a sixth rotation axis of the sixth joint J6 intersect one another.

More specifically, as shown in FIG. 4, the approaching-direction determination unit 12 first sets the position and orientation of the welding torch WT relative to a predetermined welding point Q (as an example of the predetermined working position) based on work information preliminarily stored in the storage unit 2. The work information includes welding conditions and the orientation of the welding torch WT relative to a groove of a welding line. Although FIGS. 4 to 7 illustrate the slider model and the virtual robot, model in the virtual space, reference signs used in FIGS. 1 to 3 are used as-is for the sake of convenience. The same applies to FIG. 9 to be mentioned later. Because the slider SL and the robot MR are in the virtual space, the slider SL and the robot MR should actually be referred to as a slider model and a virtual robot model to be exact. However, in descriptions including the above description with reference to FIG. 4, the terms "slider ST," and "robot MR" are used as-is. In other words, although the welding torch WT should be referred to as a welding torch model in the above description, the term "welding torch WT" is used as-is.

Subsequently, the approaching-direction determination unit 12 searches for arm approachable directions in which the arm of the robot MR is approachable such that the directions do not overlap the interference region in the ambient environment of the robot MR. More specifically, as shown in FIG. 5, the approaching-direction determination unit 12 sets an interference region AR, indicated by the interference region information stored in the interference-region-information storage unit 21, in the ambient environment of the robot MR, and searches for directions not overlapping the set interference region AR as arm approachable directions at predetermined angular pitches (e.g., 5°, 10°, 15°, and 20°) in the circumferential direction of a circle centered on a wrist rotation center RO within a plane (e.g., a horizontal plane) including the wrist rotation center RO in a state where the welding torch WT is in the position and orientation set as described above. In this case, it is preferable that the size (i.e., thickness) of the arm of the robot MR is taken into account. For example, the size (i.e., thickness) of the arm is taken into account by aligning the center line of the arm (i.e., the third link LK3) of the robot MR with each arm approachable direction. In the example shown in FIG. 5, a direction (indicated with a solid line) overlapping the interference region AR is given an evaluation score of 0 points, a direction (indicated with a single-dot chain line) not overlapping the interference region AR as a directed line segment but overlapping the interference region AR, in view of the size of the arm is given an evaluation score of 1 point, and a direction (indicated with a dashed line) not overlapping the interference region AR as a directed line segment and not overlapping the interference region AR even in view of the size of the arm is given an evaluation score of 2 points. In this embodiment, 18 directions with an evaluation score of 2 points are detected as arm approachable directions.

Then, the approaching-direction determination unit 12 selects and sets one arm approaching direction from the detected arm approachable directions. In the example shown in FIG. 5, any one of the 18 arm approachable directions may be selected and set. In this case, one arm approachable direction is selected and set as an arm approaching direction from the plurality of arm approachable directions in accordance with a predetermined rule. Although the predetermined rule may be appropriately set, the selection is to be made such that, for example, the selected one arm approachable direction is located closest to a predetermined reference position RP. Since welding in this embodiment normally involves the robot MR approaching the welding point Q (as an example of a working position) of the workpiece WK from a front-face position (i.e., front position) of the workpiece WK, the predetermined reference position RP is a front position RP of the workpiece WK in this embodiment. Accordingly, in the example shown in FIG. 5, the approaching-direction determination unit 12 selects and sets one arm approachable direction AD that is closest to the reference position RP as an arm approaching direction AD from the plurality of arm approachable directions, as shown in FIG. 6A. Consequently, as viewed from above, the arm approaching direction AD of the arm of the robot MR is determined. FIG. 6B illustrates a state where the robot MR (i.e., the virtual robot model to be exact) is disposed (i.e., image-rendered) such that the arm of the robot MR extends in the arm approaching direction AD set in this manner.

Referring back to FIG. 3, the position determination unit 13 determines the position of the slider SL based on the arm approaching direction AD determined by the approaching-direction determination unit 12. As mentioned above, by setting the position of the robot MR, the position of the slider SL is also set. Therefore, the position determination unit 13 determines the position of the robot MR based on the arm approaching direction AD determined by the approaching-direction determination unit 12, so as to determine the position of the slider SL. The position of the robot MR based on the arm approaching direction AD may be determined by a known conventional technique. For example, the position of the robot MR is determined by using the technique disclosed in Japanese Unexamined Patent Application Publication No. 2010-46753 described above, whereby the position of the slider SL is determined.

More specifically, the position determination unit 13 sets a search plane that includes the arm approaching direction AD determined by the approaching-direction determination unit 12 and in which a robot origin point O serving as an operating point of the robot MR is located in the arm approaching direction AD, sets the position of the slider SL such that the robot origin point O matches each of grid points set within the search plane, calculates an evaluation value for each grid point at the position of the slider SL, and determines the position of the slider SL based on the evaluation value. The process for setting the position and orientation of the welding torch WT described with reference to FIG. 4 corresponds to the initialization step in the technique disclosed in Japanese Unexamined Patent Application Publication No. 2010-46753 described above. Although the orientation of the positioner PS is also set as disclosed in Japanese Unexamined Patent Application Publication No. 2010-46753 described above, it is assumed that the orientation of the positioner PS is set as appropriate, and a description thereof will be omitted. The same applies hereinafter.

More specifically, for example, as shown in FIG. 7, the position determination unit 13 determines an operating range of the robot MR within the search plane including the arm approaching direction AD determined by the approaching-direction determination unit 12, extending through the robot origin point O serving as an operating point of the robot MR, and including the distal end of the robot MR (i.e., the distal end of the welding torch WT as an example of a tool), and discretely sets a plurality of grid points within this determined operating range. Thus, the robot origin point O is located in the arm approaching direction AD. The plurality of grid points are separated by a distance that is appropriately set in advance at a fine level sufficient for the searching process. The position determination unit 13 determines the position of the slider SL for each of the grid points such that the grid point and the robot origin point O match, and determines, as a position candidate, the position of the slider SL that is located within the operating range of the slider SL excluding the interference region and that enables an inverse transform for setting the orientation of the robot MR. The position determination unit 13 determines an evaluation value for each grid point corresponding to the determined position candidate. For example, the evaluation value is determined by using an evaluation function including any one of a margin from a singular orientation of the robot MR, a margin from an operating range boundary of each axis, the degree of interference or near-miss interference with the workpiece WK or the ambient environment in the orientation of the robot MR, a margin from an operating range boundary of each axis of the slider SL, and a movement amount from the previous position of each axis of the slider SL in a case where there are a plurality of working positions $Q_i$ arranged in a processing order. The position determination unit 13 extracts a grid point having the highest evaluation value greater than or equal to a predetermined threshold value from the evaluation values of the grid points, and sets the position candidate at this extracted grid point as the position of the slider SL.

An xyz Cartesian coordinate system shown in FIG. 7 having the robot origin point O as a coordinate origin point is a local coordinate system for expressing the position and orientation of the arm from the operating point, of the robot, MR. When the position of the slider SL (i.e., the position of the robot, MR) is set, the XYZ Cartesian coordinate system and the xyz Cartesian coordinate system are associated with each other.

Because the robot slider position setting device D is provided in the offline teaching device TC in this embodiment, the position determination unit 13 further uses the position of the slider SL as offline teaching data (operation data, operation program, or teaching program) of the robot MR.

In a case where there are a plurality of welding points (as an example of working positions) $Q_i$ arranged in a processing order (i=1 to 6 in this example), as in the example shown in FIG. 2, the approaching-direction determination unit 12 determines the arm approaching directions $AD_i$ in the processing order for the respective welding points $Q_i$ in a manner similar to the above description, and the position determination unit 13 determines the position of the slider $SL_i$ in a manner similar to the above description for each of the arm approaching directions $AD_i$ determined by the approaching-direction determination unit 12. In this case, the approaching-direction determination unit 12 determines the current arm approaching direction $AD_i$ such that the direction is located closest to the previous arm approaching direction $AD_{i-1}$ in the processing order.

The control processor 1, the storage unit 2, the input unit 3, the display unit 4, and the IF unit 5 are configurable by, for example, a desktop-type or notebook-type computer. For example, the computer serving as these units 1 to 5 may be disposed in an operation room in a welding factory, may be incorporated in a console (i.e., may also function as a console), or may be provided separately from a console.

Figure 8:
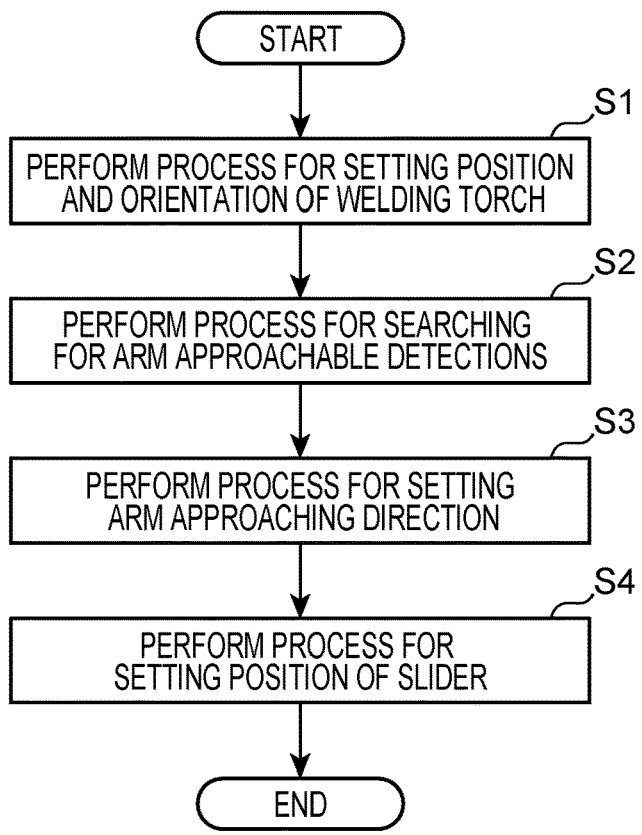
FIG. 8 is a flowchart illustrating the operation of the robot slider position setting device.

Next, the operation according to this embodiment will be described. FIG. 8 is a flowchart illustrating the operation of the robot slider position setting device.

When the power of the robot slider position setting device D (offline teaching device TC) having such a configuration is turned on, the robot slider position setting device D initializes required components and starts its operation. In the control processor 1, the control processing program thereof is executed so that the control unit 11, the approaching-direction determination unit 12, and the position determination unit 13 are functionally implemented.

In FIG. 8, a process for calculating the position of the slider SL involves the position setting device D (offline teaching device TC) first causing the approaching-direction determination unit 12 of the control processor 1 to set the position and orientation of the welding torch WT relative to a predetermined welding point Q (as an example of a predetermined working position) in step S1.

Subsequently, in step S2, the position setting device D causes the approaching-direction determination unit 12 to search for arm approachable directions in which the arm of the robot MR is approachable such that the directions do not overlap the interference region in the ambient environment of the robot MR.

Then, in step S3, the position setting device D causes the approaching-direction determination unit 12 to select one arm approachable direction from the detected arm approachable directions in accordance with a predetermined rule, and sets the selected arm approachable direction as an arm approaching direction AD.

In step S4, the position setting device D causes the position determination unit 13 of the control processor 1 to determine the position of the slider SL based on the arm approaching direction AD determined by the approaching-direction determination unit 12 in step S3, uses the determined position of the slider SL as offline teaching data (operation data, operation program, or teaching program) of the robot MR, and ends the process.

In a case where there are a plurality of welding points (as an example of working positions) $Q_i$ arranged in a processing order, as in the example shown in FIG. 2, step S1 to step S4 are executed with respect to each welding point $Q_i$.

As described above, in the robot slider position setting device D according to this embodiment, as well as a robot slider position setting method and a robot slider position setting program that are implemented in the robot slider position setting device D, the direction of the arm of the robot MR is determined such that the direction does not overlap the interference region before the position of the robot slider SL is determined, so that a case where the process for determining the position of the robot slider SL again from the beginning can be eliminated, whereby the position of the robot slider can be set efficiently.

The robot slider position setting device D, the robot slider position setting method, and the robot slider position setting program perform the search in the circumferential direction of the circle centered on the wrist rotation center RO within the plane including the wrist rotation center RO, thereby enabling the search for the arm approaching direction AD with a relatively simple process.

In a case where there are a plurality of working positions (welding points $Q_i$ as an example in this embodiment) arranged in a processing order, the robot slider position setting device D, the robot slider position setting method, and the robot slider position setting program determine the current arm approaching direction $AD_i$ such that the direction is located closest to the previous arm approaching direction $AD_{i-1}$ in the processing order, whereby the position of the robot slider SL can be determined such that the robot MR can be moved smoothly with respect to each of the working positions arranged in the processing order.

The robot slider position setting device D, the robot slider position setting method, and the robot slider position setting program set a search plane that includes the determined arm approaching direction AD and in which the robot origin point O serving as an operating point of the robot MR is located in the arm approaching direction AD, set the position of the robot slider SL for each of the grid points set within the search plane, calculate an evaluation value for each grid point, and determine the position of the robot slider SL based on the evaluation value, whereby an appropriate position of the robot slider SL can be determined automatically and efficiently.

In the above embodiment, as shown in FIG. 7, if the wrist rotation center RO is fixed and the third link LK3 is movable within the search plane, the search for the position of the slider SL is performed at each grid point of the search plane. However, if the third link LK3 is not movable or the operating range of the third link LK3 is small, the search for the position of the slider SL may be performed as follows.

Figure 9:
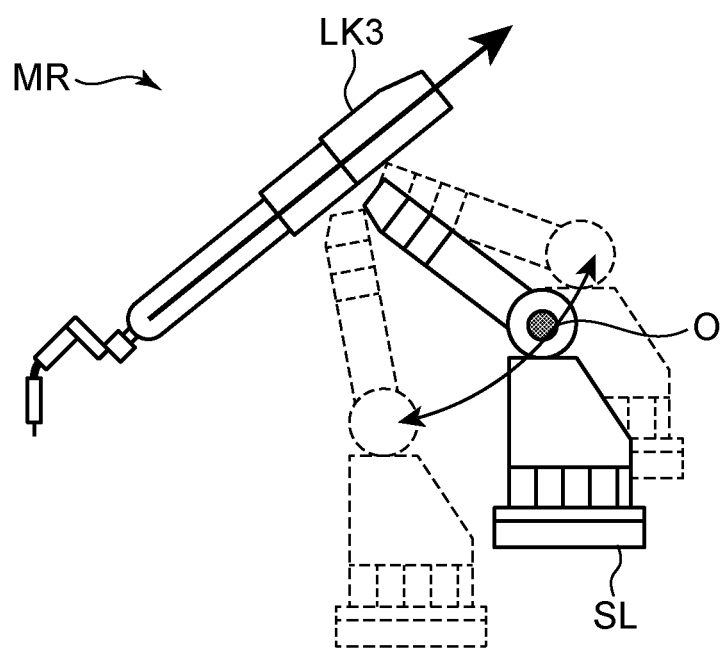
FIG. 9 is a diagram for explaining a case where a search for a robot origin point is performed in the circumferential direction of a circle centered on the position of a third joint of a robot within the search plane.

FIG. 9 is a diagram for explaining a case where a search for the robot origin point is performed in the circumferential direction of a circle centered on the position of the third joint of the robot within the search plane. Similar to FIG. 7, FIG. 9 is a side view of the robot MR. In this case, the position determination unit 13 sets the position of the slider SL such that the robot origin point O matches each of a plurality of points set in the circumferential direction of a circle centered on the position of the third joint J3 within the search plane including the arm approaching direction AD determined by the approaching-direction determination unit 12, calculates an evaluation value for each point at the position of the slider SL, and determines the position of the slider SL based on the evaluation value. More specifically, the position determination unit 13 sets a circle centered on the position of the third joint J3 and having a radius defined by the distance from the position of the third joint J3 to the robot origin point O (i.e., a distance determined in accordance with the length of the second link LK2) within the search plane including the arm approaching direction AD determined by the approaching-direction determination unit 12, and sets a plurality of points along the circumference of this set circle. For each of the points, the position determination unit 13 determines the position of the slider SL such that the point matches the robot origin point O, and determines, as a position candidate, the position of the slider SL that is located within the operating range of the slider SL excluding the interference region and that enables an inverse transform for setting the orientation of the robot, MR. The position determination unit 13 determines an evaluation value for each grid point corresponding to the determined position candidate. The evaluation values are as described above. The position determination unit 13 extracts a point having the highest evaluation value greater than or equal to the predetermined threshold value from the evaluation values of the grid points, and sets the position candidate at this extracted point as the position of the slider SL.

Although the present invention has been appropriately and sufficiently described above with reference to the drawings and the embodiment to express the present invention, it should be noted that a skilled person may readily modify or alter the above embodiment. Therefore, it is to be interpreted that a modification or an alteration implemented by a skilled person is included in the scope of the claims so long as the modification or the alteration does not deviate from the scope defined in the claims.

What is claimed is:

1. A robot slider position setting device for setting a position of a robot slider that moves while being loaded with a robot that performs predetermined work on a workpiece by using a tool provided at a distal end of the robot, the robot slider position setting device comprising:
    an interference-region-information storage unit that stores interference region information indicating an interference region with which the robot interferes in a predetermined ambient environment;
    an approaching-direction determination unit that determines a direction of an arm of the robot as an arm approaching direction such that the direction does not overlap the interference region by fixing a wrist rotation center of the robot in a state where the tool is in an orientation according to a predetermined working position;
    a position determination unit that determines the position of the robot slider based on the arm approaching direction determined by the approaching-direction determination unit; and
    a controller including circuitry, the controller controls the robot to perform the predetermined work based at least in part on the position of the robot slider determined by the position determination unit.

2. The robot slider position setting device according to claim 1, wherein the approaching-direction determination unit determines the arm approaching direction by performing a search in a circumferential direction of a circle centered on the wrist rotation center within a plane including the wrist rotation center.

3. The robot slider position setting device according to claim 1,
    wherein the working position includes a plurality of working positions arranged in a processing order,
    wherein the approaching-direction determination unit determines the arm approaching direction with respect to each of the working positions in the processing order,
    wherein the position determination unit determines the position of the robot slider with respect to each of a plurality of the arm approaching directions determined by the approaching-direction determination unit, and
    wherein the approaching-direction determination unit determines a current arm approaching direction such that the current arm approaching direction is closest to a previous arm approaching direction in the processing order.

4. The robot slider position setting device according to claim 1,
wherein the position determination unit sets a search plane that includes the arm approaching direction determined by the approaching-direction determination unit and in which a robot origin point serving as an operating point of the robot is located in the arm approaching direction, sets the position of the robot slider such that the robot origin point matches each of a plurality of grid points set within the search plane, calculates an evaluation value for each grid point at the position of the robot slider, and determines the position of the robot slider based on the evaluation value.

5. The robot slider position setting device according to claim 2,
wherein the working position includes a plurality of working positions arranged in a processing order,
wherein the approaching-direction determination unit determines the arm approaching direction with respect to each of the working positions in the processing order,
wherein the position determination unit determines the position of the robot slider with respect to each of a plurality of the arm approaching directions determined by the approaching-direction determination unit, and
wherein the approaching-direction determination unit determines a current arm approaching direction such that the current arm approaching direction is closest to a previous arm approaching direction in the processing order.

6. The robot slider position setting device according to claim 2,
wherein the position determination unit sets a search plane that includes the arm approaching direction determined by the approaching-direction determination unit and in which a robot origin point serving as an operating point of the robot is located in the arm approaching direction, sets the position of the robot slider such that the robot origin point matches each of a plurality of grid points set within the search plane, calculates an evaluation value for each grid point at the position of the robot slider, and determines the position of the robot slider based on the evaluation value.

7. The robot slider position setting device according to claim 3,
wherein the position determination unit sets a search plane that includes each arm approaching direction determined by the approaching-direction determination unit and in which a robot origin point serving as an operating point of the robot is located in the arm approaching direction, sets the position of the robot slider such that the robot origin point matches each of a plurality of grid points set within the search plane, calculates an evaluation value for each grid point at the position of the robot slider, and determines the position of the robot slider based on the evaluation value.

8. The robot slider position setting device according to claim 5,
wherein the position determination unit sets a search plane that includes each arm approaching direction determined by the approaching-direction determination unit and in which a robot origin point serving as an operating point of the robot is located in the arm approaching direction, sets the position of the robot slider such that the robot origin point matches each of a plurality of grid points set within the search plane, calculates an evaluation value for each grid point at the position of the robot slider, and determines the position of the robot slider based on the evaluation value.

9. A robot slider position setting method for setting a position of a robot slider that moves while being loaded with a robot that performs predetermined work on a workpiece by using a tool provided at a distal end of the robot, the robot slider position setting method comprising:
an interference-region setting step for setting an interference region with which the robot interferes in a predetermined ambient environment;
an approaching-direction determination step for determining a direction of an arm of the robot as an arm approaching direction such that the direction does not overlap the interference region by fixing a wrist rotation center of the robot in a state where the tool is in an orientation according to a predetermined working position;
a position determination step for determining the position of the robot slider based on the arm approaching direction determined in the approaching-direction determination step; and
controlling the robot to perform the predetermined work based at least in part on the position of the robot slider determined by the position determination step.

10. A non-transitory computer readable storage medium for setting a position of a robot slider that moves while being loaded with a robot that performs predetermined work on a workpiece by using a tool provided at a distal end of the robot, the non-transitory computer readable storage medium causing a computer to function as:
an interference-region-information storage unit that stores interference region information indicating an interference region with which the robot interferes in a predetermined ambient environment;
an approaching-direction determination unit that determines a direction of an arm of the robot as an arm approaching direction such that the direction does not overlap the interference region by fixing a wrist rotation center of the robot in a state where the tool is in an orientation according to a predetermined working position; and
a position determination unit that determines the position of the robot slider based on the arm approaching direction determined by the approaching-direction determination unit,
wherein the computer controls the robot to perform the predetermined work based at least in part on the position of the robot slider determined by the position determination step.

* * * * *